United States Patent
Chikazawa et al.

(10) Patent No.: US 10,256,711 B2
(45) Date of Patent: Apr. 9, 2019

(54) POWER CONTROL APPARATUS AND IMAGE FORMING APPARATUS USING THE SAME

(71) Applicant: KONICA MINOLTA, INC., Chiyoda-ku, Tokyo (JP)

(72) Inventors: Satoshi Chikazawa, Toyokawa (JP); Toshinori Inomoto, Toyokawa (JP); Yasuhiro Ishihara, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/878,485

(22) Filed: Jan. 24, 2018

(65) Prior Publication Data
US 2018/0219467 A1  Aug. 2, 2018

(30) Foreign Application Priority Data
Jan. 31, 2017  (JP) .................. 2017-016141

(51) Int. Cl.
| H02M 1/12 | (2006.01) |
| G03G 15/00 | (2006.01) |
| H02M 3/335 | (2006.01) |
| H02M 1/00 | (2006.01) |

(52) U.S. Cl.
CPC .......... H02M 1/12 (2013.01); G03G 15/80 (2013.01); H02M 3/33507 (2013.01); H02M 2001/0058 (2013.01); Y02B 70/1491 (2013.01)

(58) Field of Classification Search
CPC ...... H02M 3/33507; H02M 2001/0058; G03G 15/80
See application file for complete search history.

(56) References Cited

U.S. PATENT DOCUMENTS

| 5,682,576 A * | 10/1997 | Sakai ............ G03G 15/2039 219/216 |
| 2010/0322657 A1 * | 12/2010 | Kumada ......... G03G 15/5004 399/69 |
| 2012/0230744 A1 * | 9/2012 | Maruyama ...... G03G 15/2039 399/335 |

(Continued)

FOREIGN PATENT DOCUMENTS

JP  H10-268699 A  10/1998

*Primary Examiner* — Sevan A Aydin
(74) *Attorney, Agent, or Firm* — Buchanan Ingersoll & Rooney PC

(57) ABSTRACT

A power control apparatus that supplies an AC current to a load and adjusts a current amount by setting a portion of a phase range among each of half-wave periods of the AC current to be supplied as a conduction angle and setting the remainder as a non-conduction angle, includes: a reference value determiner that defines a period across a plurality of half-wave periods as a current determination period and that determines a reference value of the conduction angle; and a distribution processor that determines a distribution value to distribute the conduction angle and performs current amount adjustment by distributed conduction angles, wherein the distribution processor determines the distribution value within one current determination period such that the value includes a positive distribution value and a negative distribution value, and an average value of the distributed conduction angles is within ±2.5% with respect to the reference value.

10 Claims, 14 Drawing Sheets

(56) References Cited

U.S. PATENT DOCUMENTS

| | | | | |
|---|---|---|---|---|
| 2015/0253705 A1* | 9/2015 | Shimura | ............ | G03G 15/2039 |
| | | | | 399/33 |
| 2015/0286175 A1* | 10/2015 | Okamoto | ........... | G03G 15/2039 |
| | | | | 399/69 |
| 2015/0311805 A1* | 10/2015 | Yamashita | ........ | H02M 3/33507 |
| | | | | 363/21.01 |
| 2016/0026127 A1* | 1/2016 | Hayasaki | ............ | G03G 15/2042 |
| | | | | 399/69 |
| 2016/0231671 A1* | 8/2016 | Hayasaki | ........... | G03G 15/2042 |
| 2017/0168433 A1* | 6/2017 | Okamoto | ........... | G03G 15/2042 |
| 2017/0176918 A1* | 6/2017 | Shimura | ................ | G03G 15/80 |
| 2017/0219968 A1* | 8/2017 | Tamaki | .............. | G03G 15/2039 |
| 2017/0219970 A1* | 8/2017 | Tamaki | .............. | G03G 15/2007 |

\* cited by examiner

FIG. 6

| HALF-WAVE CURRENT AMOUNT | FIRST HALF WAVE AND SECOND HALF WAVE | THIRD HALF WAVE AND FOURTH HALF WAVE | FIFTH HALF WAVE AND SIXTH HALF WAVE | SEVENTH HALF WAVE AND EIGHTH HALF WAVE |
|---|---|---|---|---|
| WHEN DISTRIBUTION PROCESSING IS NOT PERFORMED | ALL 30% | | | |
| WHEN DISTRIBUTION PROCESSING IS PERFORMED | 32% | 28% | 32% | 28% |

FIG. 8

| HALF-WAVE CURRENT AMOUNT | FIRST HALF WAVE AND SECOND HALF WAVE | THIRD HALF WAVE AND FOURTH HALF WAVE | FIFTH HALF WAVE AND SIXTH HALF WAVE | SEVENTH HALF WAVE AND EIGHTH HALF WAVE |
|---|---|---|---|---|
| WHEN DISTRIBUTION PROCESSING IS NOT PERFORMED | ALL 30% | | | |
| WHEN DISTRIBUTION PROCESSING IS PERFORMED | 35% | 25% | 35% | 25% |

FIG. 9

| HALF-WAVE CURRENT AMOUNT | FIRST TO SECOND HALF WAVES | THIRD TO FOURTH HALF WAVES | FIFTH TO SIXTH HALF WAVES | SEVENTH TO EIGHTH HALF WAVES | NINTH TO TENTH HALF WAVES | 11TH TO 12TH HALF WAVES |
|---|---|---|---|---|---|---|
| WHEN DISTRIBUTION PROCESSING IS NOT PERFORMED | ALL 30% | | | | | |
| WHEN DISTRIBUTION PROCESSING IS PERFORMED | 32% | 28% | 31.5% | 28.5% | 31% | 29% |

FIG. 10

| HALF-WAVE CURRENT AMOUNT | FIRST TO SECOND HALF WAVES | THIRD TO FOURTH HALF WAVES | FIFTH TO SIXTH HALF WAVES | SEVENTH TO EIGHTH HALF WAVES | NINTH TO TENTH HALF WAVES | 11TH TO 12TH HALF WAVES |
|---|---|---|---|---|---|---|
| WHEN DISTRIBUTION PROCESSING IS NOT PERFORMED | ALL 30% | | | | | |
| WHEN DISTRIBUTION PROCESSING IS PERFORMED | 32% | 29.4% | 29.5% | 29.6% | 29.7% | 29.8% |

FIG. 11

| HALF-WAVE CURRENT AMOUNT | FIRST TO SECOND HALF WAVES | THIRD TO FOURTH HALF WAVES | FIFTH TO SIXTH HALF WAVES | SEVENTH TO EIGHTH HALF WAVES | NINTH TO TENTH HALF WAVES | 11TH TO 12TH HALF WAVES |
|---|---|---|---|---|---|---|
| WHEN DISTRIBUTION PROCESSING IS NOT PERFORMED | ALL 70% | | | | | |
| WHEN DISTRIBUTION PROCESSING IS PERFORMED | 68% | 70.6% | 70.5% | 70.4% | 70.3% | 70.2% |

FIG. 13

| HALF-WAVE CURRENT AMOUNT | | FIRST TO SECOND HALF WAVES | THIRD TO FOURTH HALF WAVES | FIFTH TO SIXTH HALF WAVES | SEVENTH TO EIGHTH HALF WAVES | NINTH TO TENTH HALF WAVES | 11TH TO 12TH HALF WAVES |
|---|---|---|---|---|---|---|---|
| Ih1 | WHEN DISTRIBUTION PROCESSING IS NOT PERFORMED | ALL 70% | | | | | |
| | WHEN DISTRIBUTION PROCESSING IS PERFORMED | 72.5% | 71.5% | 70.5% | 69.5% | 68.5% | 67.5% |
| Ih2 | WHEN DISTRIBUTION PROCESSING IS NOT PERFORMED | ALL 70% | | | | | |
| | WHEN DISTRIBUTION PROCESSING IS PERFORMED | 67.5% | 68.5% | 69.5% | 70.5% | 71.5% | 72.5% |

POWER CONTROL APPARATUS AND IMAGE FORMING APPARATUS USING THE SAME

The entire disclosure of Japanese patent Application No. 2017-016141, filed on Jan. 31, 2017, is incorporated herein by reference in its entirety.

BACKGROUND

Technological Field

The present invention relates to a power control apparatus that supplies an AC current to a load and adjusts the current amount by phase control instead of resistance control. The present invention relates more particularly to a power control apparatus that suppresses generation of harmonics. The present invention also relates to an image forming apparatus using the power control apparatus.

Description of the Related Art

Conventional power control techniques of this type include power supply control of a heat source in a temperature control apparatus described in JP 10-268699 A. In the technique of JP 10-268699 A, an oscillation signal of an oscillator is superimposed on temperature information in the control of the power supply with reference to the temperature of the heat source in the image forming apparatus (JP 10-268699 A, claim 4). This technique is intended to reduce harmonics by distributing a conduction angle of the current with respect to a reference value (refer to [0029] in JP 10-268699 A).

The above-described conventional technique, however, has the following problem. That is, even though reduction of harmonics has been described as an effect, there are cases of having difficulty in achieving an actual effect sufficiently. In particular, this problem frequently occurs in a case where a temperature sampling period of the heat source is long. This is because the conduction angle distribution becomes constant during one sampling period, leading to difficulty in sufficiently suppressing generation of harmonics.

SUMMARY

The present invention has been made to solve the problems of the above-described conventional technique. An object of the present invention is to provide a power control apparatus capable of reliably achieving a harmonic suppression effect regardless of a determination period of a reference value of power control, and an image forming apparatus using the power control apparatus.

To achieve the abovementioned object, according to an aspect of the present invention, there is provided a power control apparatus that supplies an AC current to a load and adjusts a current amount by setting a portion of a phase range among each of half-wave periods of the AC current to be supplied as a conduction angle and setting the remainder as a non-conduction angle, and the power control apparatus reflecting one aspect of the present invention comprises: a reference value determiner that defines a period across a plurality of half-wave periods as a current determination period and that determines a reference value of the conduction angle during the current determination period in accordance with a power demand; and a distribution processor that determines a distribution value to distribute the conduction angle with respect to the reference value and performs current amount adjustment by distributed conduction angles distributed by the determined distribution value for each of fragmented periods formed by dividing the current determination period into a plurality of periods and being an integer multiple of the half-wave period, wherein the distribution processor determines the distribution value within one current determination period such that the value includes a positive distribution value and a negative distribution value, and an average value of the distributed conduction angles as a whole of the current determination period is within ±2.5% with respect to the reference value.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a chart illustrating a current amount per half-wave period in the original current waveform in the state where the distribution processing is performed and the state where the distribution processing is not performed in the graph of FIG. 5;

FIG. 8 is a chart illustrating a current amount per half-wave period in the original current waveform in the state where the distribution processing is performed and the state where the distribution processing is not performed in the graph of FIG. 7;

FIG. 9 is a chart illustrating another example of the current amount per half-wave period;

FIG. 10 is a chart illustrating still another example of the current amount per half-wave period;

FIG. 11 is a chart illustrating still another example of the current amount per half-wave period;

FIG. 13 is a chart illustrating an example of a current amount per half-wave periods in a case where heating is performed simultaneously by two heaters.

DETAILED DESCRIPTION OF EMBODIMENTS

Figure 1:
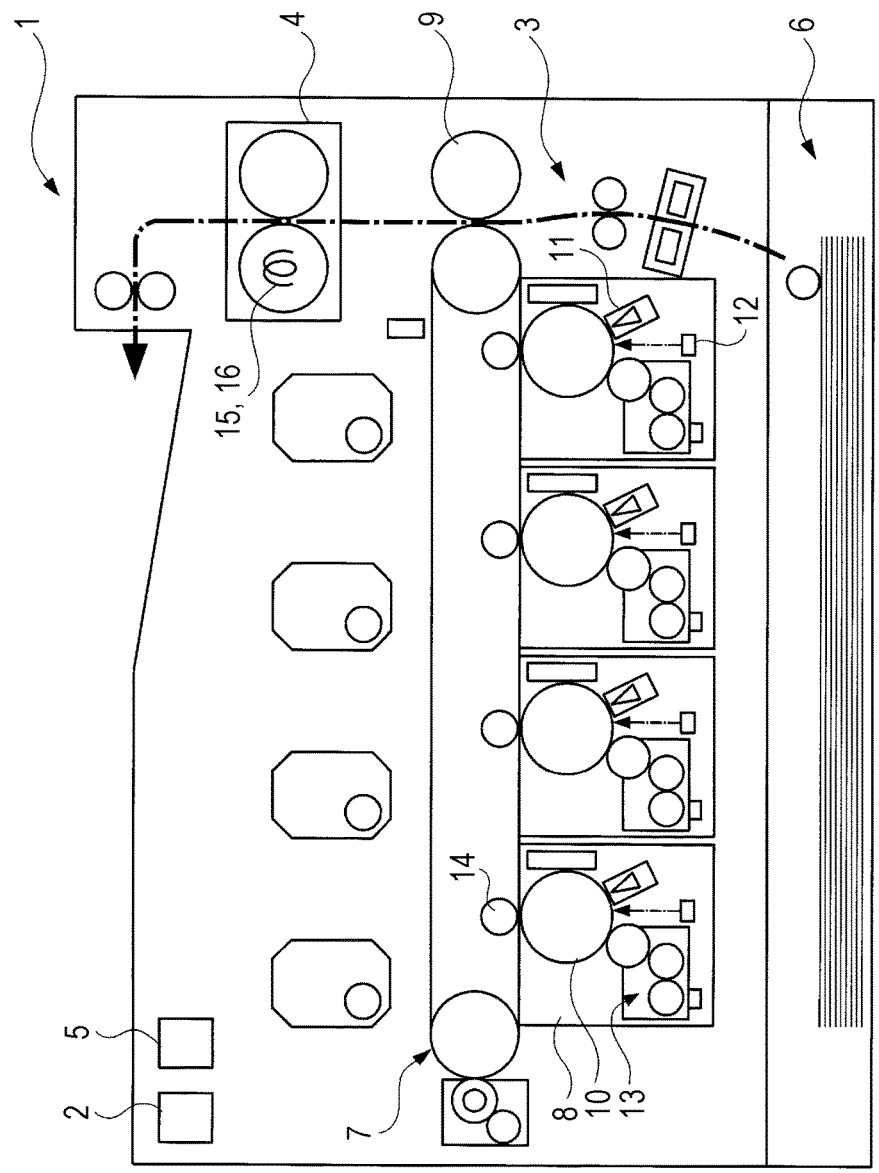
FIG. 1 is a diagram illustrating a configuration of an image forming apparatus according to an embodiment.

Hereinafter, one or more embodiments of the present invention will be described in detail with reference to the drawings. However, the scope of the invention is not limited to the disclosed embodiments. The present embodiment is application of the present invention to an image forming apparatus 1 illustrated in FIG. 1. The image forming apparatus 1 includes a power control apparatus 2. The image forming apparatus 1 further includes an image former 3, a fixing device 4, a controller 5, and a sheet feeding unit 6, in addition to the power control apparatus 2.

The image former 3 includes an intermediate transfer belt 7, image forming sections 8, and a secondary transfer roller 9. Each of the image forming sections 8 includes a photoconductor 10, a charger 11, an exposure device 12, a developing device 13, and a primary transfer roller 14. With this configuration, a toner image is formed in each of the image forming sections 8, and the formed toner image is transferred to a sheet supplied from the sheet feeding unit 6 via the intermediate transfer belt 7. The sheet carrying the toner image undergoes toner fixation by the fixing device 4, and then discharged to the outside of the apparatus. The fixing device 4 incorporates heaters 15 and 16 each being configured to function as a heat source for fixing the toner. The heaters 15 and 16 are selectively used in accordance with the size of the sheet in the width direction.

The power control apparatus 2 supplies power to each of sections in the image forming apparatus 1. The heaters 15 and 16 of the fixing device 4 are also included in the power supply targets. The controller 5 controls operation of each of sections in the image forming apparatus 1. The control target of the controller 5 also includes temperature control of the heaters 15 and 16 by power supply from the power control apparatus 2 to the heaters 15 and 16. Hereinafter, description will be provided focusing on power supply control from the power control apparatus 2 to the heaters 15 and 16.

Figure 2:
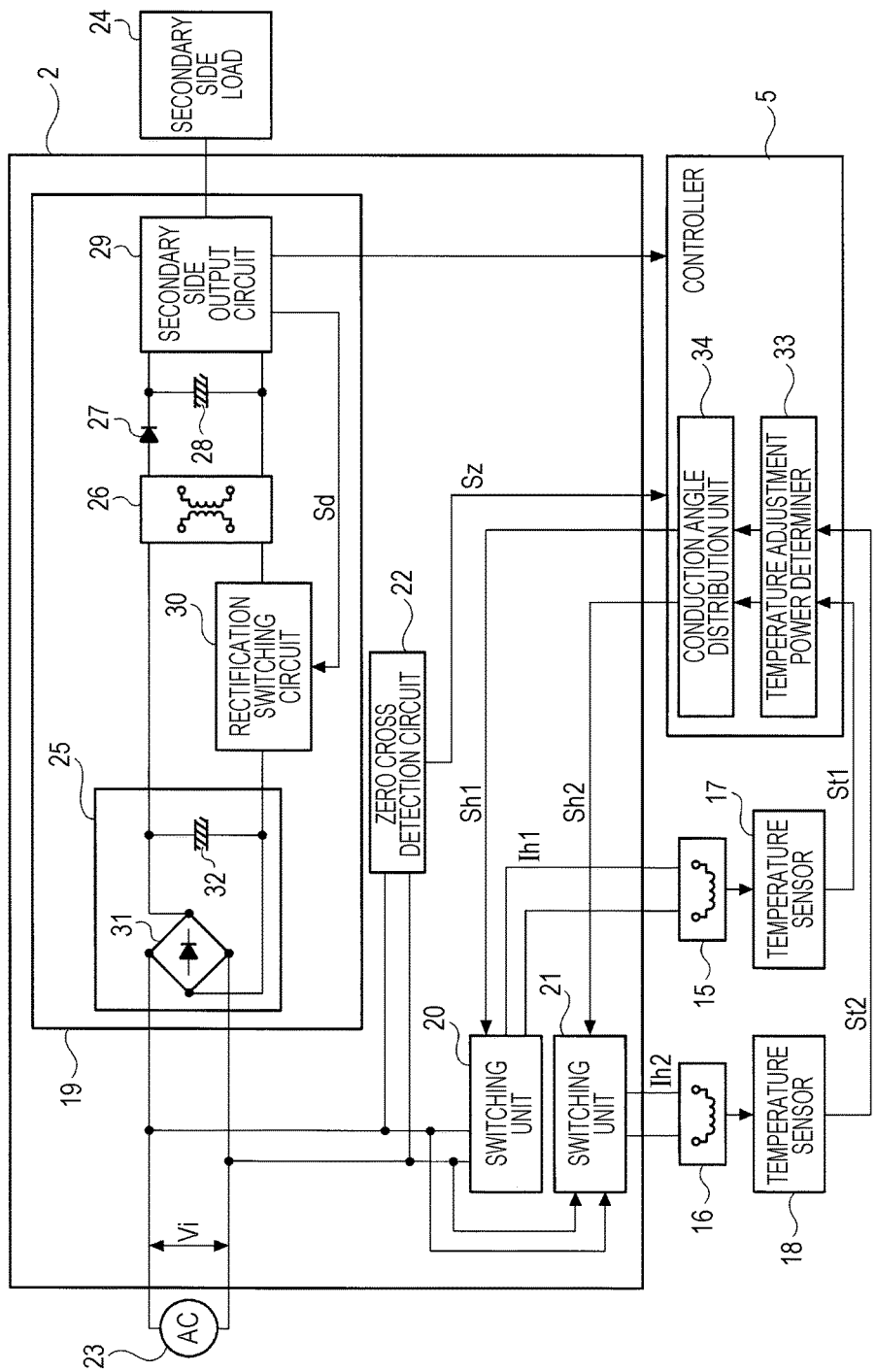
FIG. 2 is a configuration diagram of a temperature adjustment system of a fixing device in the image forming apparatus in FIG. 1.

FIG. 2 illustrates a block configuration of a temperature adjustment system of the fixing device 4 in the image forming apparatus 1. The system in FIG. 2 includes temperature sensors 17 and 18 in addition to the power control apparatus 2, the controller 5, and the heaters 15 and 16. Although not illustrated in FIG. 1, the temperature sensors 17 and 18 detect temperatures at individual positions that receive heating by the heaters 15 and 16 in the fixing device 4.

The power control apparatus 2 in FIG. 2 includes a regulator 19, switching units 20 and 21, and a zero cross detection circuit 22. The regulator 19 is a rectifier that rectifies AC power supplied from a commercial power supply 23 into DC and supplies it to a secondary side load 24. The secondary side load 24 includes rotational drive of the photoconductor 10 and the intermediate transfer belt 7, bias application of the charger 11, the developing device 13, the primary transfer roller 14, and the secondary transfer roller 9, light emitting operation of the exposure device 12, and sheet feeding operation of the sheet feeding unit 6. The controller 5 is also included in DC power supply targets of the regulator 19.

The switching units 20 and 21 are switches that turn on and off an AC power supply from the commercial power supply 23 to the heaters 15 and 16. That is, the AC is unchangedly supplied to the heaters 15 and 16, not the rectified DC. A current Ih1 is supplied from the switching unit 20 to the heater 15 while a current Ih2 is supplied from the switching unit 21 to the heater 16. The switching units 20 and 21 are constituted with switching elements such as triacs, IGBTs, MOSFETs. The zero cross detection circuit 22 is a circuit that detects a timing at which a voltage value Vi of the AC power from the commercial power supply 23 becomes zero, that is, a zero cross point.

The regulator 19 includes a rectifier circuit 25, a transformer 26, a diode 27, a capacitor 28, a secondary side output circuit 29, and a rectification switching circuit 30. The rectification switching circuit 30 is arranged between the rectifier circuit 25 and the transformer 26 and is turned on and off by a control signal Sd from the secondary side output circuit 29. The rectifier circuit 25 includes a diode bridge 31 and a diode 32.

In the above-configured regulator 19, a full-wave rectified smoothed pulsating flow is output by the rectifier circuit 25 that receives an input of AC power from the commercial power supply 23. Subsequently, the rectification switching circuit 30 is turned on and off at a constant period by the control signal Sd, whereby a high frequency AC is input into the transformer 26. The AC is transformed by a transformer 26 and converted into a DC by the diode 27 and the capacitor 28. Here, the secondary side output circuit 29 performs feedback control of the rectification switching circuit 30, thereby obtaining the DC power of a target voltage. The output of the secondary side output circuit 29 is supplied to the secondary side load 24 and the controller 5.

Next, the controller 5 will be described. The following description will focus on portions related to the temperature control of the heaters 15 and 16 among the functions of the controller 5, and illustration and description of the other portions will be omitted. The controller 5 in FIG. 2 includes a temperature adjustment power determiner 33 and a conduction angle distribution unit 34. The temperature adjustment power determiner 33 is a functional portion that determines a conduction angle to be described below, in the AC current supplied to the heaters 15 and 16. Accordingly, temperature detection signals St1 and St2 are input from the temperature sensors 17 and 18 into the temperature adjustment power determiner 33. The conduction angle distribution unit 34 is a functional portion that performs distribution processing of distributing the conduction angle determined by the temperature adjustment power determiner 33 for each of AC cycles (details will be described below) in order to suppress the generation of harmonics. The conduction angle distribution unit 34 turns on and off the switching units 20 and 21 with control signals Sh1 and Sh2. The controller 5 also receives a zero cross detection signal Sz from the zero cross detection circuit 22.

Next, temperature adjustment control of the heaters 15 and 16 in the image forming apparatus 1 and the power control apparatus 2 according to the present embodiment will be described. As described above, the temperature adjustment control according to the present embodiment is power supply control of the heaters 15 and 16 by the switching units 20 and 21. Note that the power supplied to the heaters 15 and 16 via the switching units 20 and 21 is the AC power from the commercial power supply 23. First, power supply to the heaters 15 and 16 in a state the distribution processing in the conduction angle distribution unit 34 is stopped will be described.

Figure 3:
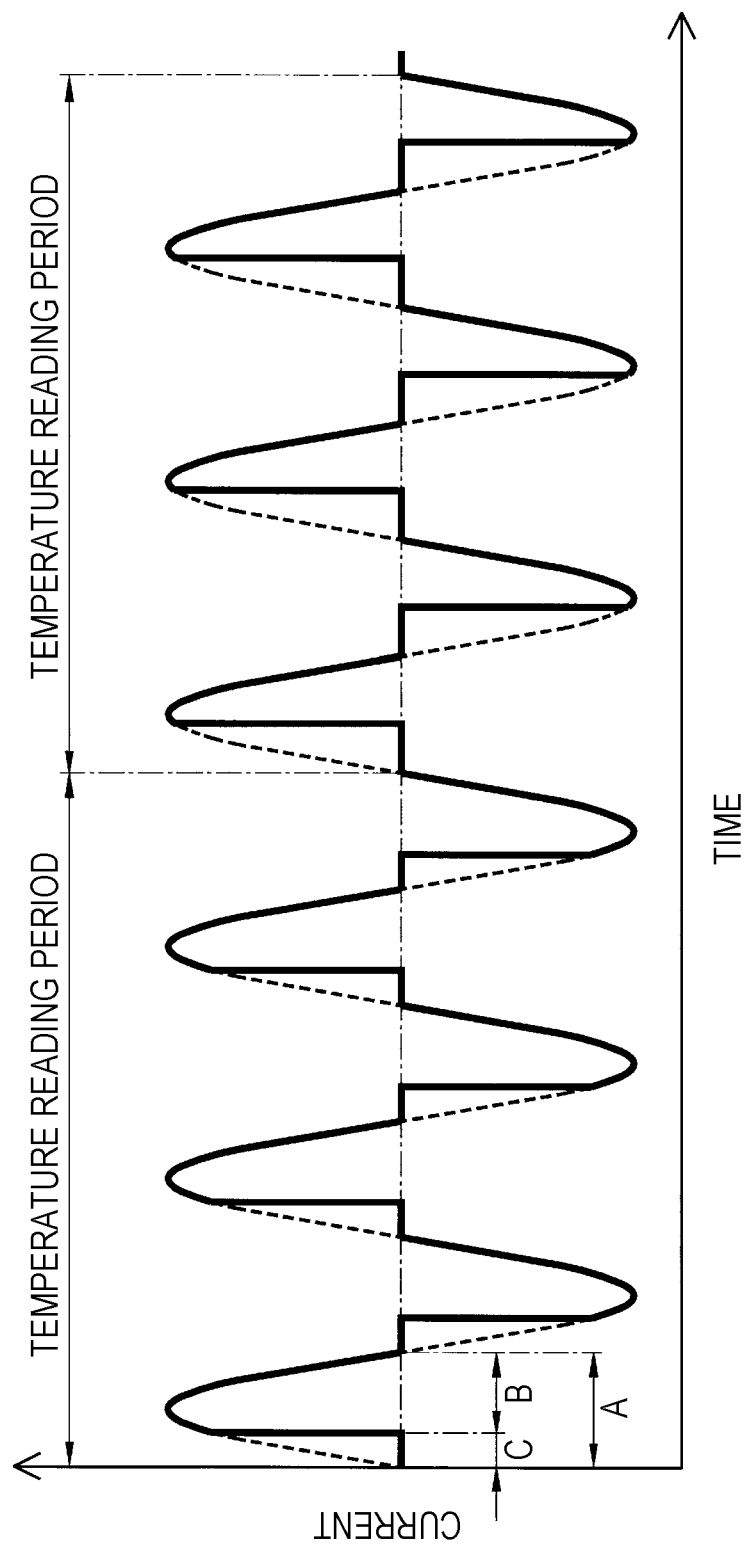
FIG. 3 is a graph illustrating a waveform of a heater current in a state where distribution processing is not performed.

FIG. 3 illustrates a waveform of the heater current Ih1 (or Ih2) in a state where distribution processing is not performed. In the graph in FIG. 3, the heater current is fixed at zero during a period of a portion of the sinusoidal waveform (indicated by "C" in FIG. 3), and the AC waveform from the commercial power supply 23 unchangedly becomes the waveform of the heater current in the remaining period (similarly indicated by "B"). This period C is a period during which the switching unit 20 (or 21) is turned off. The period B is a period in which the switching unit 20 (or 21) is turned on. The sum of the period B and the period C is a half-wave period A. The proportion of the period B with respect to the half-wave period A defined as an angle of 180° is referred to as a conduction angle.

The greater the conduction angle, the greater the power supplied to the heater 15 (or 16) and the heat generation amount. In contrast, the smaller the conduction angle, the smaller the power supplied to the heater 15 (or 16) and the heat generation amount. In this respect, phase control that determines the magnitude of the conduction angle in accordance with a power demand for maintaining the fixing device 4 at a target temperature is the function of the temperature adjustment power determiner 33.

For this purpose, the temperature adjustment power determiner 33 increases the conduction angle when the shortage of the temperature indicated by the temperature detection signal St1 (or St2) with respect to the target temperature of the fixing device 4 is large. That is, the on period of the control signal Sh1 (or Sh2) is increased. Specifically, a rising timing from off to on of the control signal Sh1 (or Sh2) is advanced. When the temperature shortage is small, the conduction angle is decreased by delaying the rising timing of the control signal Sh1 (or Sh2). In a case where a sheet passes through the fixing device 4, the conduction angle can be increased. This is performed to compensate for the heat removal from the fixing device 4 by the passage of the sheet. Note that the down timing of the control signal Sh1 (or Sh2) from on to off is based on the zero cross detection signal Sz.

Referring further to FIG. 3, a series of six half-wave periods A constitute a single "temperature reading period" (current determination period). During this single "temperature reading period", the conduction angle is constant in all of the six half-wave periods A. During the second "temperature reading period" on the right side of FIG. 3, the conduction angle is also constant in all of the six half-wave periods A. However, when comparing the first "temperature reading period" with the second "temperature reading period", the conduction angle is slightly smaller in the second "temperature reading period". This is because the conduction angle is newly determined on the basis of the new temperature detection signal St1 (or St2).

With this setting alone, however, the phase control would be a cause of generation of harmonics in the power supplied from the commercial power supply 23. This is because the half-wave period A of the same current waveform is repeated during one "temperature reading period". To cope with this, the conduction angle distribution unit 34 performs distribution processing, thereby suppressing the harmonics. The distribution processing by the conduction angle distribution unit 34 is to change the conduction angle every half-wave period A within one "temperature reading period". There is of course a need to follow the conduction angle determined by the temperature adjustment power determiner 33 in order to maintain the fixing device 4 at the target temperature. For this purpose, however, it would be sufficient that the average value of the conduction angles of the half-wave period A included in one "temperature reading period" substantially matches the determined conduction angle.

Figure 4:
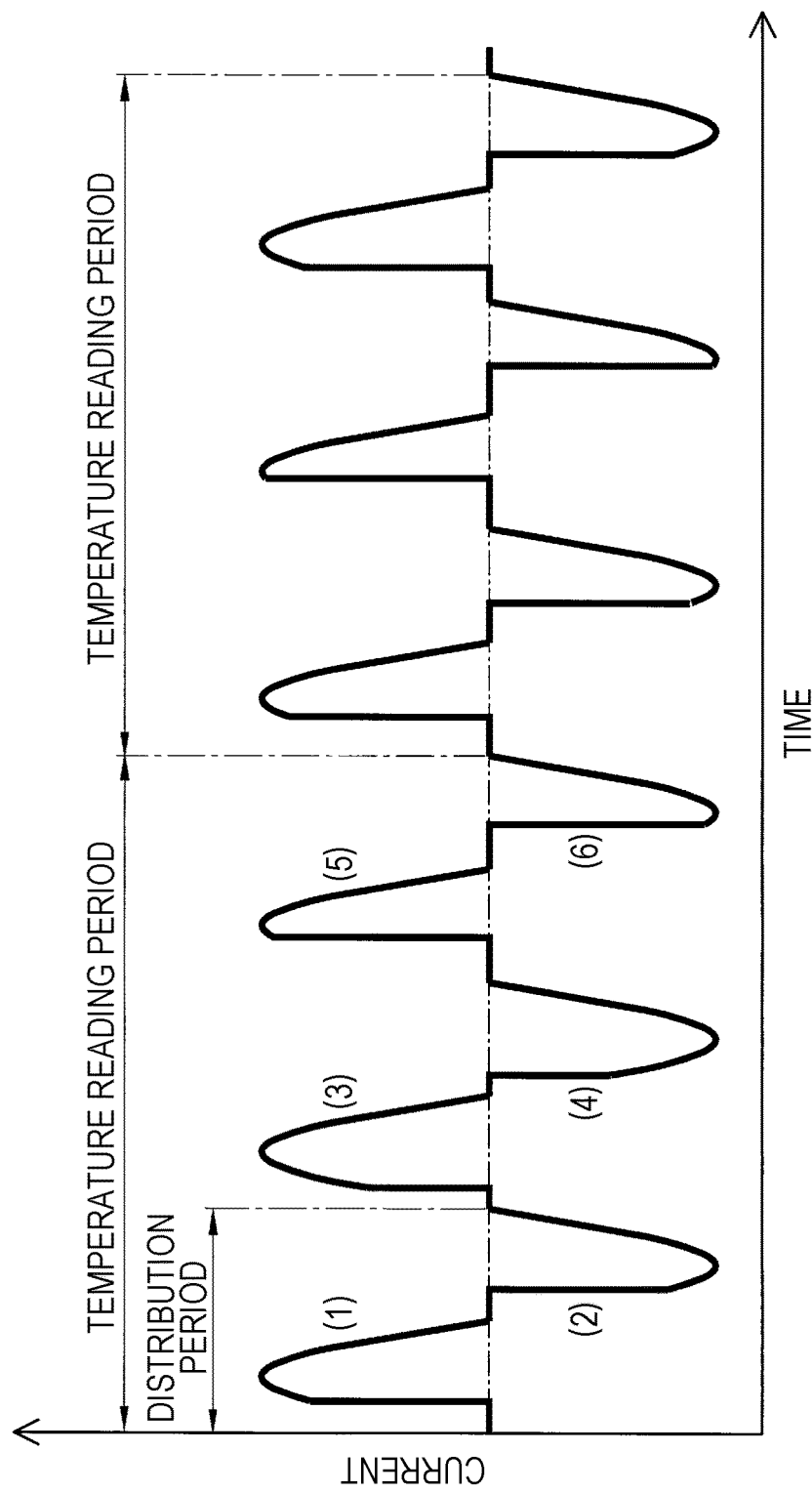
FIG. 4 is a graph illustrating a waveform of a heater current in a state where distribution processing is performed.

By performing the distribution processing, the waveform illustrated in FIG. 3 becomes the waveform as illustrated in FIG. 4. In the graph of FIG. 4, the conduction angle is not constant in each of the half-wave periods A of the first "temperature reading period". Specifically, the conduction angle in the third and fourth half-wave periods A is slightly larger than the conduction angle in the first and second half-wave periods A. In contrast, the conduction angle in the fifth and sixth half-wave periods A is slightly smaller than the initial conduction angle. Consequently, the average of the conduction angles of the first to sixth half-wave periods A matches the conduction angle of the first and second half-wave periods A. Furthermore, the conduction angle of the first and second half-wave periods A matches the conduction angle of each of the half-wave periods A of the first "temperature reading period" in FIG. 3. This also applies to the second "temperature reading period" in FIG. 4.

In the graph of FIG. 4, the number of repetition times of half-wave period A of the same current waveform is merely two. Therefore, in the graph of FIG. 4, similar temperature control as in the case of FIG. 3 is performed while the generation of harmonics is suppressed. This reduces an adverse effect of the harmonics to the secondary side load 24. In the graph of FIG. 4, the two periods as the number of times of repetition of the half-wave period A of the same conduction angle is defined as a "distribution period" (fragmented period).

Figure 5:
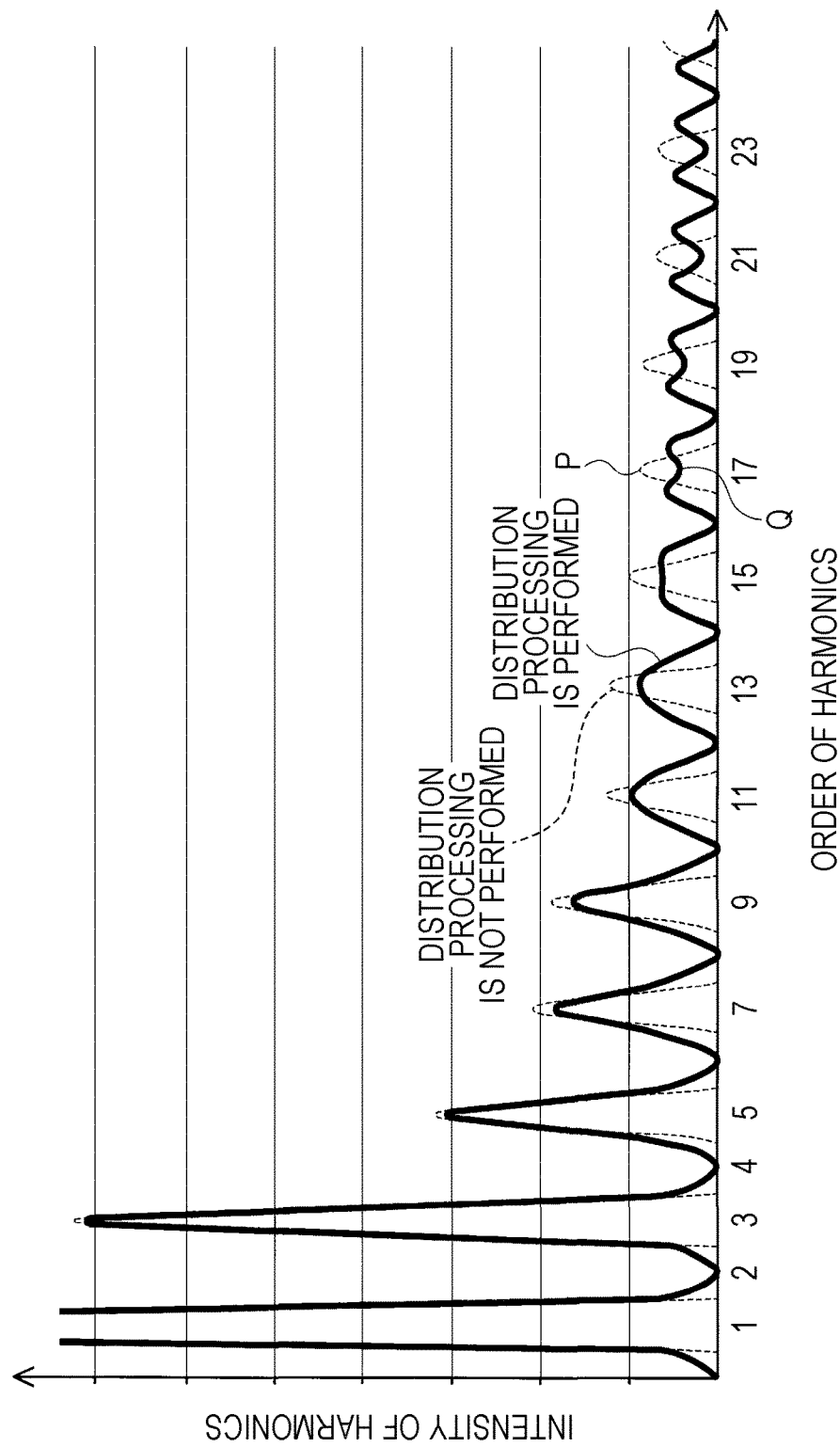
FIG. 5 is a graph (part 1, distribution width 2%) illustrating a comparison of harmonic intensity between a state where distribution processing is performed and a state where distribution processing is not performed.

Next, effects of the distribution processing will be explained. The graph of FIG. 5 illustrates a comparison of harmonic intensity between the state where distribution processing is performed and the state where distribution processing is not performed. The graph of FIG. 5 is a spectrum obtained by performing Fourier transform on the current waveforms (waveforms illustrated by solid lines and broken lines in FIGS. 3 and 4) in the state where the distribution processing is performed and the state where the distribution processing is not performed. FIG. 6 illustrates the current amount of each of the half-wave periods A (the percentage of the effective current value with respect to the conduction angle is) 180° for the current waveform in the state where the distribution processing is performed and the state where the distribution processing is not performed in the graph of FIG. 5.

In the example illustrated in FIG. 6, the current amount in the state where the distribution processing is not performed is 30% in all the half-wave periods A. In contrast, the current amounts of 32% and 28% alternately appear every half-wave period A in the state where the distribution processing is performed. That is, the "temperature reading period" includes both the positive distribution amount and the negative distribution amount. This equalizes the average values of the current amounts in the state where the distribution processing is not performed and in the state where the distribution processing is not performed. This leads to an equalized heat generation amount in the heater 15 (or 16) in the state where the distribution processing is not performed and in the state where the distribution processing is not performed. Moreover, in the example of FIG. 6, the current amount after distribution processing always differs between a series of two "distribution periods". In the example of FIG. 6, the "distribution period" is twice the half-wave period A and the "temperature reading period" is four times (or even an integer multiple thereof) the half-wave period A. In addition, the distribution width (maximum value of an absolute value of the difference between the current amounts when the distribution processing is not performed and the distribution processing is performed) is 2%.

In the graph of FIG. 5, the orders of the harmonics are represented on the horizontal axis. For example, comparison of the intensity of the 17th harmonic in the graph of FIG. 5 can be performed by comparing a point P (distribution processing is not performed) and a point Q (distribution processing is performed). In view of the whole graph of FIG. 5, the harmonic intensity in odd orders is lower in the case of distribution processing is performed than in the case where distribution processing is not performed in any of the orders. While there is no noticeable difference in relatively low orders such as the third and fifth orders, the harmonic intensity is obviously lowered in the high orders of the 11th or more by execution of distributed processing. In particular, in the 23rd and higher orders, the harmonic intensity in the case where the distribution processing is performed is at a very low level close to zero.

Moreover, in FIG. 5, there is no generation of harmonics in even orders also in the case where the distribution processing is performed. This is the effect of the arrangement that the "distribution period" in FIG. 6 is an even multiple of the half-wave period A as described above. That is, in periods of a combination of the odd-numbered half-wave period A (positive direction) and the half-wave period A (even-numbered, negative direction) immediately thereafter, that is, in periods of every full-wave period, the DC component of the current waveform is not changed by performing distribution processing. This is because the increase and decrease in the conduction angle due to the distribution processing are the same in each of the full-wave period.

Figure 7:
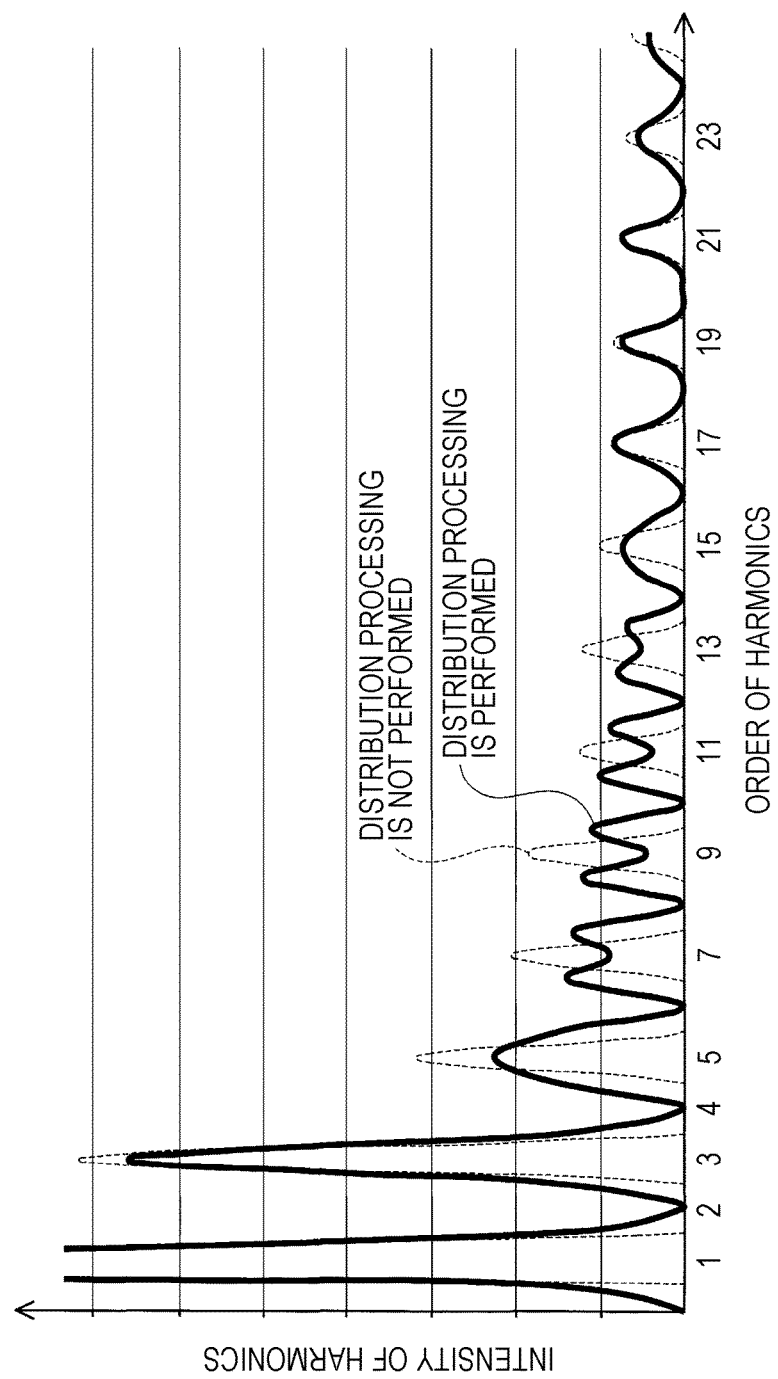
FIG. 7 is a graph (part 2, distribution width 5%) illustrating a comparison of harmonic intensity between a state where distribution processing is performed and a state where distribution processing is not performed.

FIG. 7 is a harmonic intensity spectrum when the distribution width is increased to 5%. FIG. 8 illustrates the current amount in each of the half-wave periods A in the current waveform in the state where the distribution processing is performed and in the state where the distribution processing is not performed in the graph of FIG. 7. In the graph of FIG. 7 as well, there is no case of the odd order in which harmonic intensity is higher in the case where the distribution processing is performed than in the case where the distribution processing is not performed. Additionally, no harmonics are generated in the even orders.

In the case of FIG. 7, however, the effect of the distribution processing is smaller in the odd 17th order to the 23th order as compared with the case of FIG. 5. In general knowledge, it is considered that the harmonics of the order of the 40th order or less would mainly affect operation of surrounding electronic devices. In this sense, regarding the suppression of odd-order harmonics in the above-described range, the example of FIG. 5 is superior to the example of FIG. 7. According to an experiment conducted by the present inventor, the distribution width is preferably 2.5% or less in order to suppress harmonics of the order of the above-described range. On the other hand, a too small distribution width might decrease the effect of the distribution processing, and thus, a desirable distribution width is 1.0% or more.

FIG. 9 illustrates another example of the current amount in each of the half-wave periods A in the current waveform in the state where the distribution processing is performed and in the state where the distribution processing is not performed. In the example of FIG. 9, the "distribution period" is twice the half-wave period A as in FIGS. 6 and 8, while setting the "temperature reading period" to 12 times the half-wave period A. FIG. 9 illustrates one period of the "temperature reading period". In the example of FIG. 9, illustration of the graph of the harmonic intensity spectrum as illustrated in FIG. 5 and FIG. 7 is omitted. In the example in FIG. 9, the current amount in the state where the distribution processing is not performed is also 30% in all the half-wave periods A.

In the example of FIG. 9, the current amount in the state where the distribution processing is performed is mutually different in the six "distribution periods" within the "temperature reading period". The distribution width is at the maximum 2% ("first to second half waves" and "third to fourth half waves"), and at the minimum 1% ("ninth to tenth half waves" and "11th to 12th half waves"). Naturally, the average current amount of the whole "temperature reading period" is 30% as in the case where the distribution processing is not performed. In this manner, by setting the current amount to be mutually different in each of the "distribution periods" within the "temperature reading period", the effect of suppressing harmonics is further enhanced as compared with the case of FIGS. 6 and 8. Such control is particularly significant when the "temperature reading period" is longer with respect to the "distribution period".

FIG. 10 illustrates still another example of the current amount in each of the half-wave periods A in the current waveform in the state where the distribution processing is performed and the state where the distribution processing is not performed. In the example of FIG. 10, the "distribution period" is twice the half-wave period A as in the above-described examples, while the "temperature reading period" is set to 12 times the half-wave period A as in the case of FIG. 9. In the example of FIG. 10, the current amount in the state where the distribution processing is not performed is also set to 30% (phase angle is less than 90°) in all half-wave periods A.

In the example of FIG. 10, the current amount in the state where the distribution processing is performed is also mutually different in the six "distribution periods" within the "temperature reading period". Among them, the current amount is distributed on the positive side with respect to of 30%, that is, the side closer to 50% solely one time of "first and second half-wave periods." In the remaining five "distribution periods", the current amount is distributed to the negative side with respect to 30%, that is, the side away from 50%. The maximum value of distribution width in FIG. 10 is 2% of "first to second half waves". In the example of FIG. 10, the "distribution period" in which the current amount is a value close to 50% within the "temperature reading period" is solely one time ("first to second half waves"). In the remaining five "distribution period", the current amount far from 50% is used.

This achieves, in the example of FIG. 10, the higher effect of suppressing harmonics than in the case of FIGS. 6 and 8. The phase control is control by switching an AC waveform by the conduction angle. Distortion of waveform due to this switching is the main cause of harmonics. Therefore, performing phase control with a current amount close to 50% (conduction angle close to 90°) would likely to generate harmonics. This is because the conduction period B and the non-conduction period C illustrated in FIG. 3 are bilaterally symmetrical on the graph. In the example of FIG. 10, by suppressing the use of a current amount close to 50% as much as possible, the effect of suppressing harmonics is enhanced.

The example of FIG. 11 illustrates a case where the same control as in the example of FIG. 10 is performed in a situation where the current amount in a state where the distribution processing is not performed exceeds 50% (90° in terms of phase angle). In the example of FIG. 11, the current amount in the case where the distribution processing is not performed is set to 70%. In the case of FIG. 11, the "distribution period" in which the current amount is distributed to the negative side with respect to 70% is solely "first to second half waves" contrary to the case of FIG. 10. In the remaining five "distribution periods", the current amount distributed to the positive side with respect to 70% is used. Thus, a similar effect as in the case of FIG. 10 is obtained.

In the examples illustrated in FIGS. 10 and 11, the distribution patterns are selectively used in accordance with the current amount in a state where the distribution processing is not performed. In a case where the current amount in the state where the distribution processing is not performed is 50%, it is sufficient to use a distribution pattern (for example, the distribution pattern in FIG. 9) in which the distribution amount is equally distributed between the positive side and the negative side.

Figure 12:
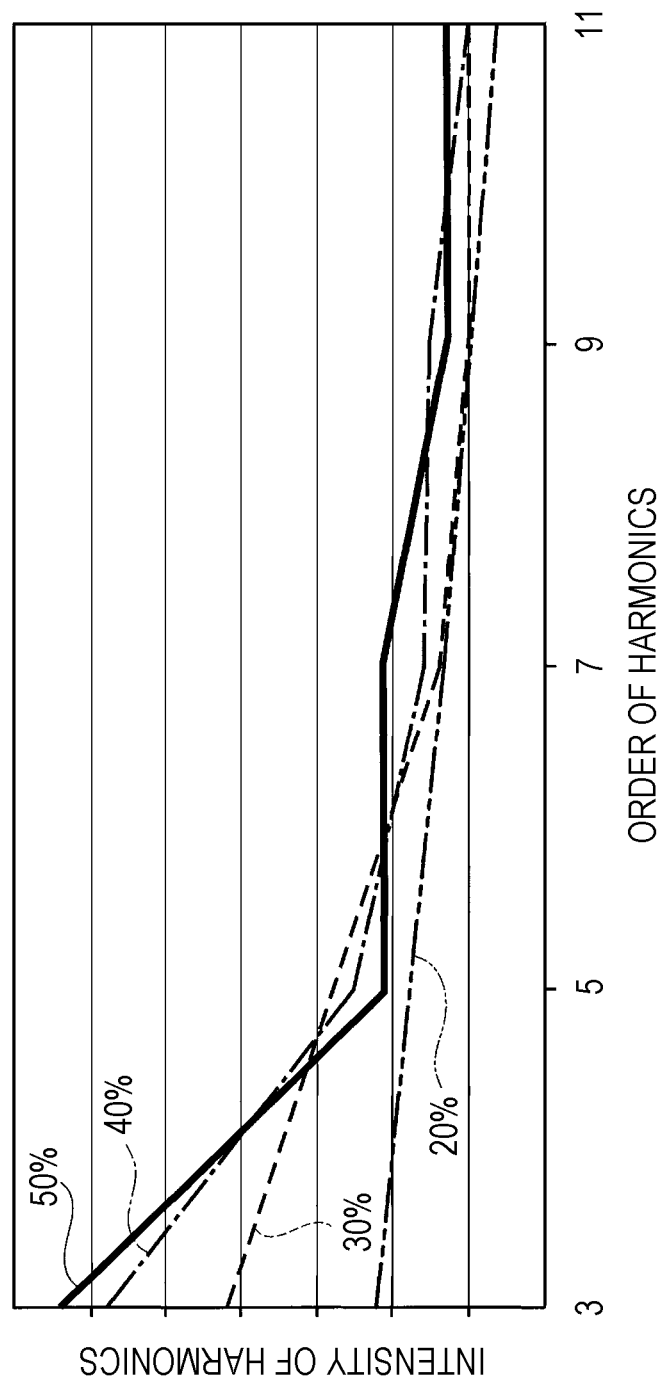
FIG. 12 is a graph illustrating a harmonic generation tendency for individual reference current amounts of phase control.

FIG. 12 is a graph illustrating a harmonic generation tendency for each of the current amounts in a state where distribution processing is not performed in the phase control. In this manner, the likelihood of generation of harmonics in each of the orders depends on the original current amount. FIG. 12 indicates that the higher the current amount, the higher the likelihood of generation of lower order harmonics. Consequently, it is desirable to change the maximum value of the distribution width or the arrangement of the current amounts within the "temperature reading period" in accordance with the original current amount. Specifically, the larger the original current amount, more emphasis needs to be placed on suppression of harmonics of lower order such as third order. To achieve this, for example, the control contents may be preferably tabulated beforehand for each of the original current amounts.

While the above description merely discussed one of the heaters 15 and 16, a case where heating is performed simultaneously by the both heaters will be described. FIG. 13 illustrates an exemplary case of this. FIG. 13 illustrates the current amount of the current Ih1 of the heater 15 at the upper stage and illustrates the current amount of the current Ih2 of the heater 16 at the lower stage. In the example of FIG. 13, the current amount in a state where the distribution processing is not performed is 70% in both the upper and lower stages. In both the upper and lower stages, the distribution width is set to 2.5%.

In the upper stage, the current amount is sequentially lowered from the maximum 72.5% to the minimum 67.5%. In contrast, in the lower stage, the current amount is sequentially increases from the minimum 67.5% to the maximum 72.5% in a reversed manner. That is, in any of the "distribution periods" from "first to second half waves" to "11th to 12th half waves", the distribution amounts have a difference merely in the sign between the upper stage and the lower stage. With this arrangement, in any "distribution period", the average value of the current amount in the upper stage and the lower stage is set to be the same as the current amount in the case where the distribution processing is not performed. In this manner, the total current amount of the currents Ih1 and Ih2 is equalized in each of the "distribution periods". This prevents generation of uneven temperature adjustment due to the occurrence of temporary excessive power application to the fixing device 4. This also prevents temporary excessive burden to be applied on the commercial power supply 23 as the power supply source.

In the example of FIG. 13, the distribution widths are equalized for both the upper and lower stages. Actually, this assumes that the heaters 15 and 16 use the same rated power. In a case where the heaters 15 and 16 use different rated powers, it is preferable to adjust the distribution width accordingly. Specifically, the ratio of the distribution width may be set to the reciprocal of the ratio of the rated power. With this arrangement, it is possible to equalize the total current amount in each of the "distribution periods" even in a case where the rated powers of the heaters 15 and 16 are mutually different.

Figure 14:
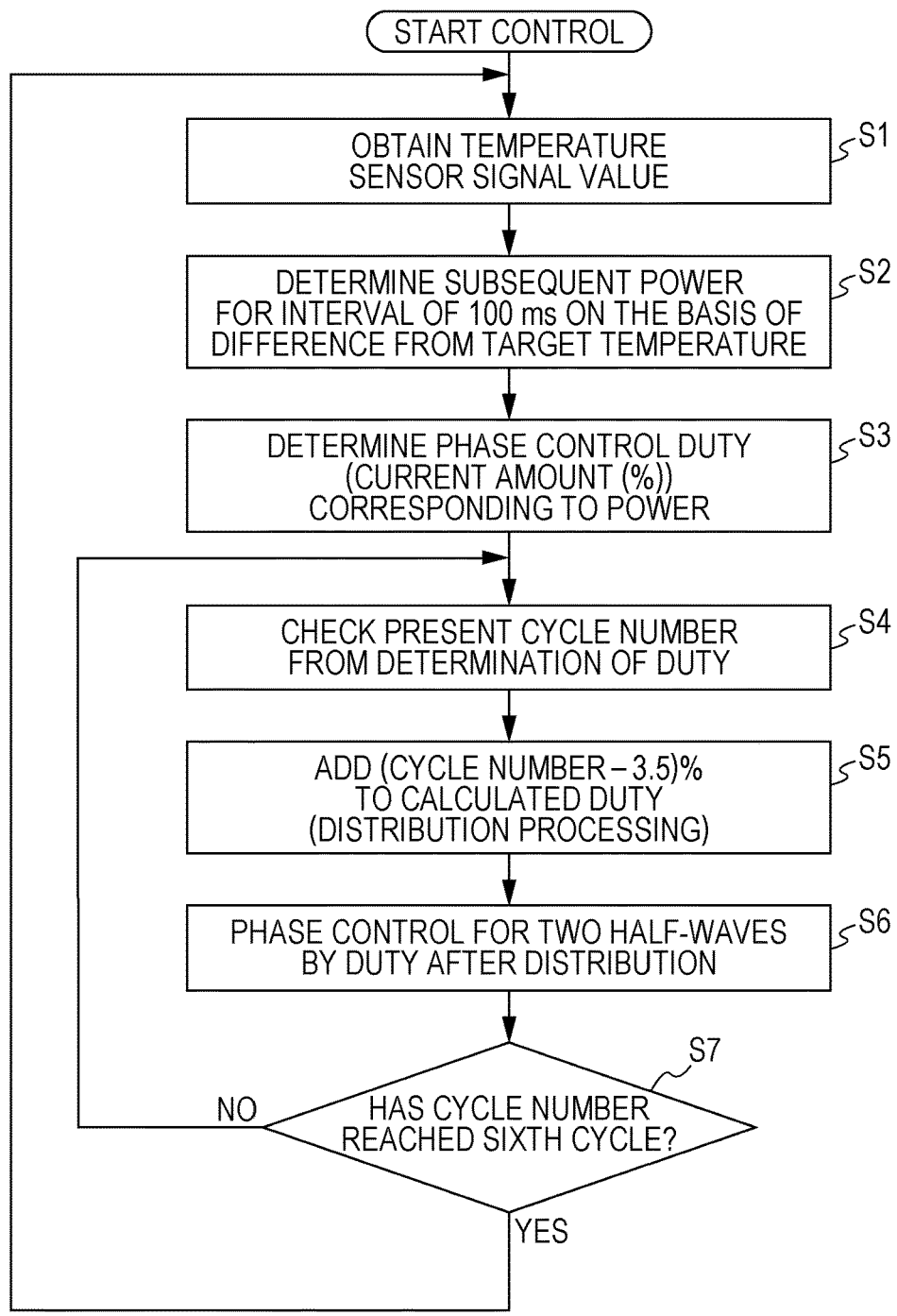
FIG. 14 is a flowchart illustrating a temperature adjustment control procedure according to the present embodiment.

FIG. 14 illustrates a flowchart of the temperature adjustment control of the controller 5 in the image forming apparatus 1. FIG. 14 illustrates an exemplary case under the following conditions.

AC frequency: 60 Hz
Temperature reading period: 12 half-wave period (100 ms)
Distribution period: 2 half-wave period
Distribution width: 2.5%
Distribution pattern: pattern of the lower stage in FIG. 13

Basically, the flowchart in FIG. 14 is constantly executed during operation of the image forming apparatus 1. According to the flowchart, a temperature detection signal St1 (or St2) of the temperature sensor 17 (or 18) is first obtained (S1). This is a procedure to grasp the current temperature of the fixing device 4. Subsequently, the power to be supplied to the heater 15 (or 16) is determined (S2) on the basis of the difference between the obtained current temperature and the target temperature of the fixing device 4. Basically, the greater the shortage of the current temperature with respect to the target temperature, the higher the power is to be determined.

Subsequently, the duty of the phase control, that is, the above-described current amount (%) is determined (S3) on the basis of the determined power. What is determined here is a basic current amount (corresponding to "when distribution processing is not performed" in FIG. 6, or the like) before undergoing distribution processing. The basic current amount determined here is applied for one period of the "temperature reading period". That is, application of this continues until the next determination of S2. The processing up to this point is performed by the temperature adjustment power determiner 33 of the controller 5 in FIG. 2.

Upon determination of the basic current amount, distribution processing is performed (S4 to S7). Specifically, the current amount after distribution processing in each of the "distribution periods" within the "temperature reading period" is obtained individually. It is first checked the cycle number of the "distribution period" within the "temperature reading period" in acquisition of the current amount (S4). Herein, according to the above-described setting, the cycle number of "distribution period" is "six" at maximum (temperature reading period/distribution period). The cycle number in the case of shifting from S3 to S4 for the first time is "one". Every time the current amount is obtained, the target cycle number is incremented one by one.

Next, the current amount for the "distribution period" of the target cycle number is actually obtained (S5). Specifically, the distribution amount is obtained in accordance with the cycle number, and then, the distribution amount is added to the basic current amount obtained in the above-described S3 so as to obtain the current amount for the "distribution period" of the cycle number. Note that the distribution amount may be a positive value or a negative value depending on the cycle number. Accordingly, the current amount obtained in S5 may be larger or smaller than the basic current amount in accordance with the cycle number.

Phase control for two half-wave periods is performed by the current amount obtained in this manner (S6). Subsequently, it is judged whether processing of all "distribution periods" of the "temperature reading period" has been completed (S7). Specifically, this judgment is performed by checking whether the current target cycle number is "six". In a case where the number has not reached "six" (S7: No), the procedure returns to S4 and similar processing is performed for the next cycle number. In a case where the cycle number is "six" (S7: Yes), processing for all "distribution periods" of the "temperature reading period" is judged to be completed. Accordingly, the procedure returns to S1 and processing is continued for the next "temperature reading period". The above is the details of the temperature adjustment control in FIG. 14.

Although omitted in the flowchart of FIG. 14, in a case where the basic current amount determined in S3 is 0% or 100%, the distribution processing itself is unnecessary. Moreover, as the method of calculating the distribution amount of S5, the calculation formula illustrated in FIG. 14 is an example. In a case where a pattern other than the pattern illustrated in the lower stage of FIG. 13 is used as the distribution pattern, the calculation formula also becomes different accordingly. Moreover, there may be prepared a table of distribution amounts for each of the cycle numbers in advance rather than performing calculation using a calculation formula. Furthermore, as illustrated in FIG. 10 and FIG. 11 as the distribution pattern, the intervals between individual distribution amounts need not be equalized.

As described above in detail, according to the present embodiment, in performing power supply to the fixing device 4 of the image forming apparatus 1 by phase control, distribution processing in which the conduction angle is changed by the "distribution period" within the "temperature reading period" is performed. This suppresses generation of harmonics while appropriately performing temperature adjustment of the fixing device 4. This achieves the image forming apparatus 1 and the power control apparatus 2 capable of suppressing the situation in which the generation of harmonics adversely affects other portions even in a condition where the temperature of the fixing device 4 is raised while being temperature-adjusted.

Note that the present embodiment is merely illustrative and is not to be construed as a limitation of the present invention. Accordingly, various enhancements and modifications can be made within the scope not departing from the spirit of the present invention. For example, in the above-described embodiment, the average value of the current amount is equalized in a state where distribution processing is not performed and in a state where distribution processing is not performed. Being equalized or the same herein is not intended to mean they are strictly equal or the same. It is allowable to judge it is equalized or the same in a case where the average value of the current amounts in the state where the distribution processing is performed is within ±2.5% (more preferably within the range of ±1%) with respect to the reference current amount.

While the power control apparatus 2 and the controller 5 are illustrated in separate boxes in FIG. 2, this is optional and it is allowable to configure such that individual elements of the controller 5 are included in the power control apparatus 2. While FIG. 3 arranges the non-conduction period C at the beginning of one half-wave period A and the conduction period B at the end, the order of the non-conduction period C and the conduction period B may be reversed. Moreover, the power control apparatus 2 is not limited to one that supplies power to the fixing device 4 of the image forming apparatus 1, and may supply power to another type of device.

Although embodiments of the present invention have been described and illustrated in detail, the disclosed embodiments are made for purposes of illustration and example only and not limitation. The scope of the present invention should be interpreted by terms of the appended claims

What is claimed is:

1. A power control apparatus that supplies an AC current to a load and adjusts a current amount by setting a portion of a phase range among each of half-wave periods of the AC current to be supplied as a conduction angle and setting the remainder as a non-conduction angle, the power control apparatus comprising:
   a reference value determiner that defines a period across a plurality of half-wave periods as a current determination period and that determines a reference value of the conduction angle during the current determination period in accordance with a power demand; and
   a distribution processor that determines a distribution value to distribute the conduction angle with respect to the reference value and performs current amount adjustment by distributed conduction angles distributed by the determined distribution value for each of fragmented periods formed by dividing the current determination period into a plurality of periods and being an integer multiple of the half-wave period,
   wherein the distribution processor determines the distribution value within one current determination period such that
   the value includes a positive distribution value and a negative distribution value, and
   an average value of the distributed conduction angles as a whole of the current determination period is within ±2.5% with respect to the reference value.

2. The power control apparatus according to claim 1, wherein the distribution processor sets a length of the fragmented period to an even multiple of the half-wave period.

3. The power control apparatus according to claim 1, wherein the distribution processor sets a maximum absolute value of the distribution value such that deviation with respect to the case of directly adjusting the current amount on the basis of the reference value is 2.5% or less in terms of an effective current value.

4. The power control apparatus according to claim 1, wherein the distribution processor sets the distribution values of a series of the fragmented periods to mutually different values.

5. The power control apparatus according to claim 1, wherein the distribution processor performs the current amount adjustment by the distributed conduction angle in solely a case where the reference value is not any of angles of 0° and 180° as a phase angle.

6. The power control apparatus according to claim 1, wherein, in a case where the reference value is smaller than 90° as a phase angle, the distribution processor sets a sum of the lengths of the fragmented periods in which the distribution value is negative to be greater than a sum of the lengths of the fragmented periods in which the distribution value is positive, and
   in a case where the reference value is larger than 90° as the phase angle, the distribution processor sets a sum of the lengths of the fragmented periods in which the distribution value is positive to be greater than a sum of the lengths of the fragmented periods in which the distribution value is negative.

7. The power control apparatus according to claim 1, wherein the distribution processor includes, for each of the reference values, a table in which distribution values for each of the fragmented periods within the current determination period are predetermined, and
   the table for each of the reference values determines the distribution value for each of the fragmented periods such that the higher the reference value, the more emphasis is placed on suppression of lower order harmonics.

8. An image forming apparatus comprising:
an image former that forms an image on a medium with toner;
a fixer that fixes the toner by heating the medium on which the image is formed by the image former; and
a power controller that controls power to be supplied to the fixer,
wherein the power controller is the power control apparatus according to claim 1.

9. The image forming apparatus according to claim 8,
wherein the fixer incorporates a plurality of heaters, and
the distribution processor separately determines distribution values for the plurality of heaters, and sets the distribution values simultaneously used so as to include a positive value and a negative value.

10. The image forming apparatus according to claim 8, further comprising
a temperature sensor that obtains a temperature of the fixer,
wherein the reference value determiner determines the reference value in accordance with the temperature of the fixer.

* * * * *